(12) United States Patent
Yamaura

(10) Patent No.: US 10,559,842 B2
(45) Date of Patent: Feb. 11, 2020

(54) END PLATE

(71) Applicant: TOYOTA BOSHOKU KABUSHIKI KAISHA, Aichi-ken (JP)

(72) Inventor: Kunihiro Yamaura, Tokai (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 181 days.

(21) Appl. No.: 15/942,019

(22) Filed: Mar. 30, 2018

(65) Prior Publication Data
US 2018/0301734 A1 Oct. 18, 2018

(30) Foreign Application Priority Data

Apr. 12, 2017 (JP) ................. 2017-078847

(51) Int. Cl.
*H01M 8/2484* (2016.01)
*H01M 8/04029* (2016.01)

(52) U.S. Cl.
CPC ..... *H01M 8/2484* (2016.02); *H01M 8/04029* (2013.01); *H01M 2250/20* (2013.01)

(58) Field of Classification Search
CPC .......... H01M 2250/20; H01M 8/0247; H01M 8/0258; H01M 8/04029; H01M 8/2484
See application file for complete search history.

(56) References Cited

U.S. PATENT DOCUMENTS 9,991,525 B2 * 6/2018 Takeyama ......... H01M 8/04104

FOREIGN PATENT DOCUMENTS

JP     2016-91845     5/2016

* cited by examiner

*Primary Examiner* — Carlos Barcena
(74) *Attorney, Agent, or Firm* — Greenblum & Bernstein, P.L.C.

(57) ABSTRACT

An end plate has a recess extending in the horizontal direction and configured to form a flow path in which cooling water flows. Ribs are formed on the bottom surface of the recess and arranged at intervals in the vertical direction so as to extend in the horizontal direction. The cooling water flows in from the passage of a cell stack at one end in the horizontal direction of the recess. A hole that allows the cooling water to flow out is provided at the other end and at a position higher than the portion into which the cooling water flows. The inner wall surfaces of the recess spread vertically toward the hole in the portion connected to the passage. The end close to the passage of the lowermost one of the ribs is closer to the hole than the ends close to the passage of the other ribs.

2 Claims, 4 Drawing Sheets

END PLATE

BACKGROUND

The present invention relates to an end plate.

As disclosed in Japanese Laid-Open Patent Publication No. 2016-91845, a fuel cell mounted on a vehicle such as an automobile is equipped with an end plate that functions as a manifold for causing fluid, specifically, fuel gas, oxidation gas, and coolant to flow through the cell stack of the fuel cell. The fuel cell is cooled by coolant supplied to and discharged from the cell stack via the end plate, while generating power using fuel gas and oxidation gas supplied to and discharged from the cell stack via the end plate.

The end plate is shaped as a rectangle having a pair of horizontal long sides and a pair of vertical short sides. The end plate has an opposed surface facing an end in the cell stacking direction of the cell stack, a recess, which opens in the opposed surface and forms a flow path through which coolant flows. The recess extends in the horizontal direction along the opposed surface. The end plate also has ribs on the bottom surface of the recess. The ribs protrude to the opening position of the recess, are provided at intervals in the vertical direction, and are formed to extend in the horizontal direction.

The recess has an inlet, through which coolant flows in, at one end in the horizontal direction, and an outlet, through which the coolant flows out, at the other end in the horizontal direction. The outlet is located at a position higher than the inlet because if the outlet is located at a position lower than the inlet, the air in the coolant might stay in the flow path in the recess.

The opposed surface, the recess, and the ribs in the end plate are covered by a plastic layer. When the end plate is fixed to a case, which surrounds the cell stack, the portion of the plastic layer that covers the opposed surface and the portions of the plastic layer that cover the distal end faces in the protruding direction of the ribs contact the end in the cell stacking direction of the cell stack. In this case, the cell stack is pressed in the cell stacking direction by the opposed surface and the ribs, so that the favorable cell stacking structure of the cell stack is maintained.

At this time, the opening of the recess formed in the opposed surface of the end plate is closed by the end in the cell stacking direction of the cell stack. This forms the flow path, through which coolant flows, inside the recess. The portion between the inlet and the outlet in this flow path is partitioned by the ribs, which are provided at intervals in the vertical direction. The coolant flows in the horizontal direction through the portions in the flow path that are partitioned by the ribs. The coolant cools the end in the cell stacking direction of the cell stack.

The fluid in the flow path and the end plate are insulated from each other by a portion of the plastic layer that covers the inner surface of the recess and the outer surfaces of the ribs. The end plate and the cell stack are insulated from each other by the portion of the plastic layer that covers the opposed surface and the portions of the plastic layer that cover the distal end faces in the protruding direction of the ribs.

From the viewpoint of efficiently cooling the end in the cell stacking direction of the cell stack with the coolant flowing through the flow path in the recess of the end plate, the coolant preferably passes through the portions in the flow path that are partitioned by the ribs in a uniform manner.

However, in the flow path in the recess, since the outlet is located at a position higher than the inlet, the flow of the coolant from the inlet to the outlet tends to be directed upward. As a result, the coolant flows less smoothly in the lowest one of the portions partitioned by the ribs of the flow path than the other partitioned portions. Therefore, the portion of the end in the cell stacking direction of the cell stack that corresponds to the lowermost portion of the flow path in the recess cannot be easily cooled, resulting in uneven cooling of the end.

SUMMARY

Accordingly, it is an objective of the present invention to provide an end plate that is capable of preventing the cooling of the end in the cell stacking direction of a cell stack from being uneven.

Means for solving the above-described problem will now be described.

To achieve the foregoing objective, an end plate is provided that is shaped as a rectangle having a pair of horizontal long sides and a pair of vertical short sides. The end plate is provided at an end in a cell stacking direction of a cell stack in a fuel cell and is used to supply coolant to and discharge coolant from the cell stack. A recess configured to form a flow path in which the coolant flows is open in an opposed surface that faces the end in the cell stacking direction of the cell stack and is formed to extend in a horizontal direction along the opposed surface. A plurality of ribs is formed on a bottom surface of the recess. The ribs protrude to an opening position of the recess and being arranged at intervals in a vertical direction so as to extend in the horizontal direction. An inlet portion, which allows the coolant to flow into the flow path in the recess from the cell stack, is provided at an end in the horizontal direction of the recess. An outlet hole, which allows the coolant to flow out from the flow path in the recess, is provided at another end in the horizontal direction of the recess and at a position higher than the inlet portion. A pair of upper and lower inner wall surfaces in the recess spreads vertically toward the outlet hole in a portion of the recess that is connected to the inlet portion. An end close to the inlet portion of a lowermost one of the ribs is closer to the outlet hole than ends close to the inlet portion of the other ribs.

In accordance with another aspect, an end plate is provided that is shaped as a rectangle having a pair of horizontal long sides and a pair of vertical short sides. The end plate is provided at an end in a cell stacking direction of a cell stack in a fuel cell and is used to supply coolant to and discharge coolant from the cell stack. A recess configured to form a flow path in which the coolant flows is open in an opposed surface that faces the end in the cell stacking direction of the cell stack and is formed to extend in a horizontal direction along the opposed surface. A plurality of ribs is formed on a bottom surface of the recess. The ribs protrude to an opening position of the recess and being arranged at intervals in a vertical direction so as to extend in the horizontal direction. An inlet portion, which allows the coolant to flow into the flow path in the recess from the cell stack, is provided at an end in the horizontal direction of the recess. An outlet hole, which allows the coolant to flow out from the flow path in the recess, is provided at another end in the horizontal direction of the recess and at a position higher than the inlet portion. A pair of upper and lower inner wall surfaces in the recess spreads vertically toward the outlet hole in a portion of the recess that is connected to the inlet portion. An end close to the outlet hole of a lowermost one of the ribs is closer to the inlet portion than ends close to the outlet hole of the other ribs.

DETAILED DESCRIPTION OF THE PREFERRED EMBODIMENTS

First Embodiment

An end plate according to a first embodiment will now be described with reference to FIGS. 1 to 3.

Figure 1:
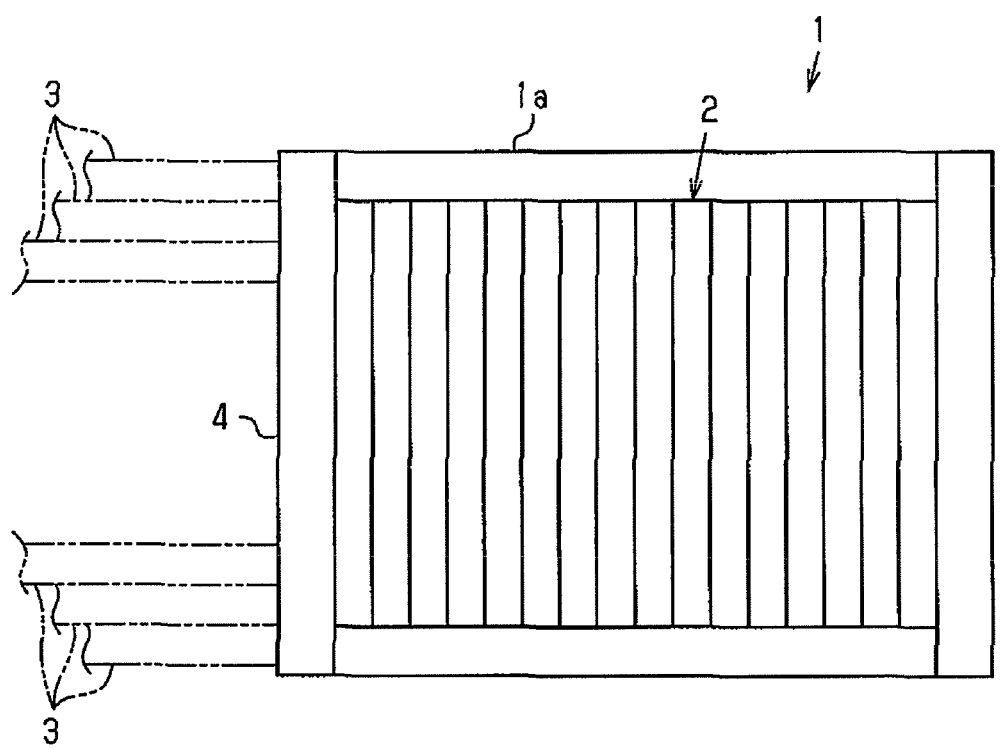
FIG. 1 is a schematic diagram illustrating a way in which an end plate is attached to the cell stack of a fuel cell.

As shown in FIG. 1, a fuel cell 1 includes a cell stack 2 and an end plate 4, which is located at an end in the cell stacking direction of the cell stack 2 (the left-right direction in FIG. 1). The end plate 4 is used to cause fluid, specifically hydrogen (fuel gas), air (oxidation gas), and cooling water (coolant) to flow through the cell stack 2. The end plate 4 is a metal plate to which pipes 3, through which the fluid flows, are connected. The end plate 4 is attached to a case 1a, which is provided in the fuel cell 1 so as to surround the cell stack 2. The cell stack 2 uses the hydrogen and air supplied and discharged through the end plate 4 to generate power and is cooled by the cooling water supplied and discharged through the end plate 4.

Figure 2:
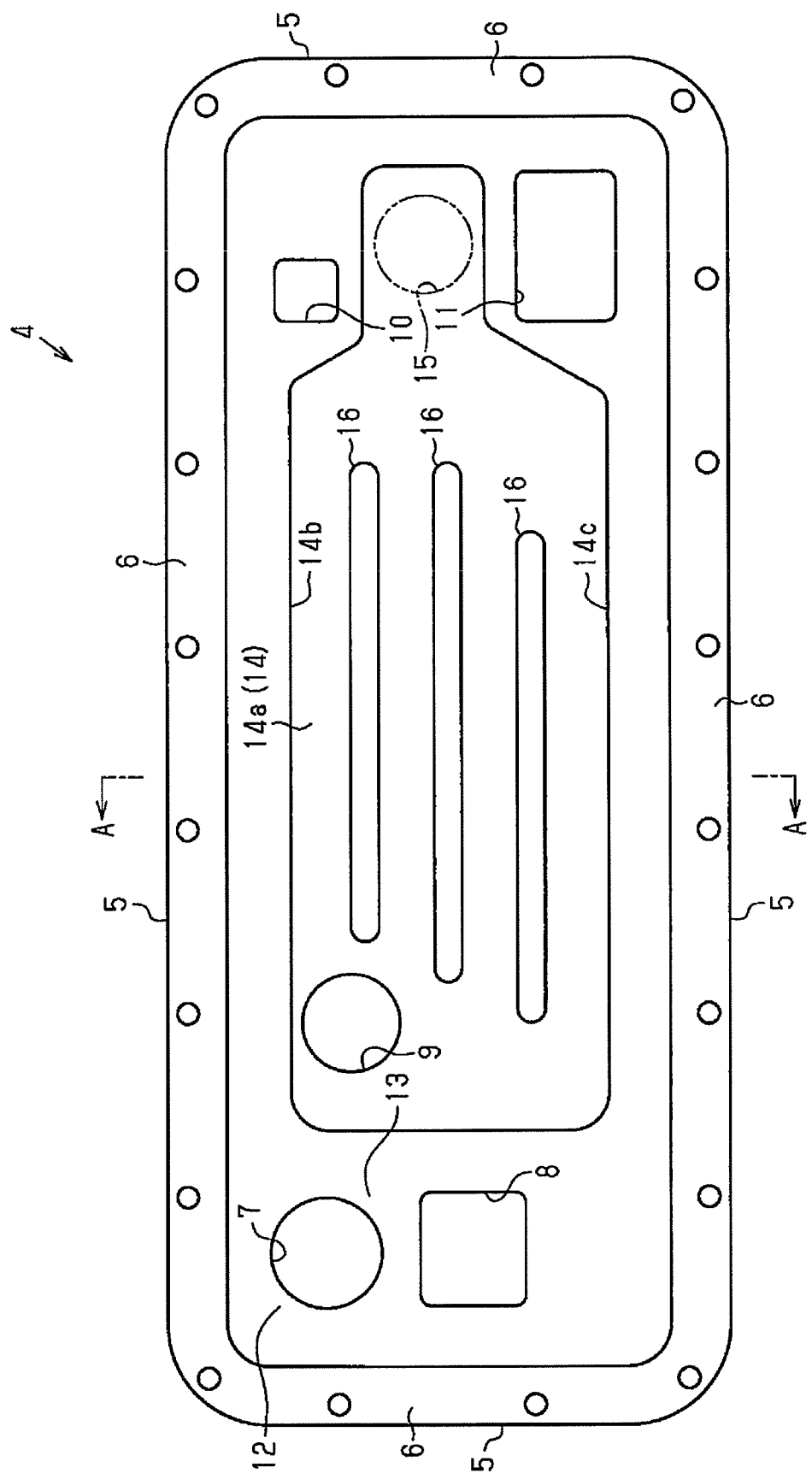
FIG. 2 is a schematic plan view of the end plate of FIG. 1, as viewed from the cell stack.

FIG. 2 schematically shows a state of the end plate 4 of FIG. 1 as seen from the cell stack 2. The end plate 4 is shaped as a rectangle having a pair of horizontal long sides and a pair of vertical short sides. The end plate 4 has on the outer periphery a fastening portion 5 extending along the long sides and the short sides. The end plate 4 is fastened to the case 1a (FIG. 1), for example, with bolts at the fastening portion 5. The surface of the fastening portion 5 on the side facing the cell stack 2 (the surface on the near side of the sheet of FIG. 2) constitutes a mounting surface 6, which is brought into contact with and fixed to the case 1a.

The end plate 4 has holes 7 to 11 in a part surrounded by the fastening portion 5. The holes 7 to 11 extend through the end plate 4 in the thickness direction (the direction orthogonal to the sheet of FIG. 2). The holes 7 to 11 constitute flow paths through which the fluid flows. The holes 7, 8, 10, and 11 are open in an opposed surface 12 of the end plate 4, which faces the end in the cell stacking direction of the cell stack 2. Further, the end plate 4 includes a recess 14, which is open in the opposed surface 12 and extends along the opposed surface 12 in the long-side direction of the end plate 4 (horizontal direction). The hole 9 is opened in a bottom surface 14a of the recess 14 at the left end in the horizontal direction. The hole 9 and the recess 14 constitute a flow path through which the fluid flows.

When the fastening portion 5 of the end plate 4 is fixed to the case 1a (FIG. 1), the flow paths constituted by the holes 7, 8, 10, 11 are connected to the cell stack 2. At this time, the opening of the recess 14 formed in the opposed surface 12 is closed by the end in the cell stacking direction of the cell stack 2, and a flow path through which cooling water flows is formed in the recess 14. Further, the right end of the flow path in the recess 14 in the long-side direction (the horizontal direction) is connected to a passage 15 for cooling water formed in the cell stack 2.

The cooling water flows from the passage 15 into the flow path in the recess 14, and thereafter, the cooling water flows in the flow path in the direction in which the recess 14 extends and flows out from the hole 9. The right end in the horizontal direction of the recess 14, which is connected to the passage 15, functions as an inlet portion for allowing coolant to flow in from the cell stack 2. The hole 9 functions as an outlet hole through which the cooling water flows out from the recess 14. The hole 9 is located at a position higher than the portion (right end portion) of the recess 14 that is connected to the passage 15 so as to prevent the air in the cooling water from staying in the flow path in the recess 14.

The recess 14 has a pair of upper and lower inner wall surfaces 14b, 14c. The upper and lower inner wall surfaces 14b, 14c spread vertically toward the hole 9 in the portion of the recess 14 that is connected to the passage 15. The end plate 4 also has ribs 16 protruding from the bottom surface 14a of the recess 14. The ribs 16 are provided at intervals in the vertical direction and formed to extend in the horizontal direction. The end close to the passage 15 (the right end) of the lowermost one of the ribs 16 is closer to the hole 9 (to the left) than the ends close to the passage 15 of the other ribs 16.

Figure 3:
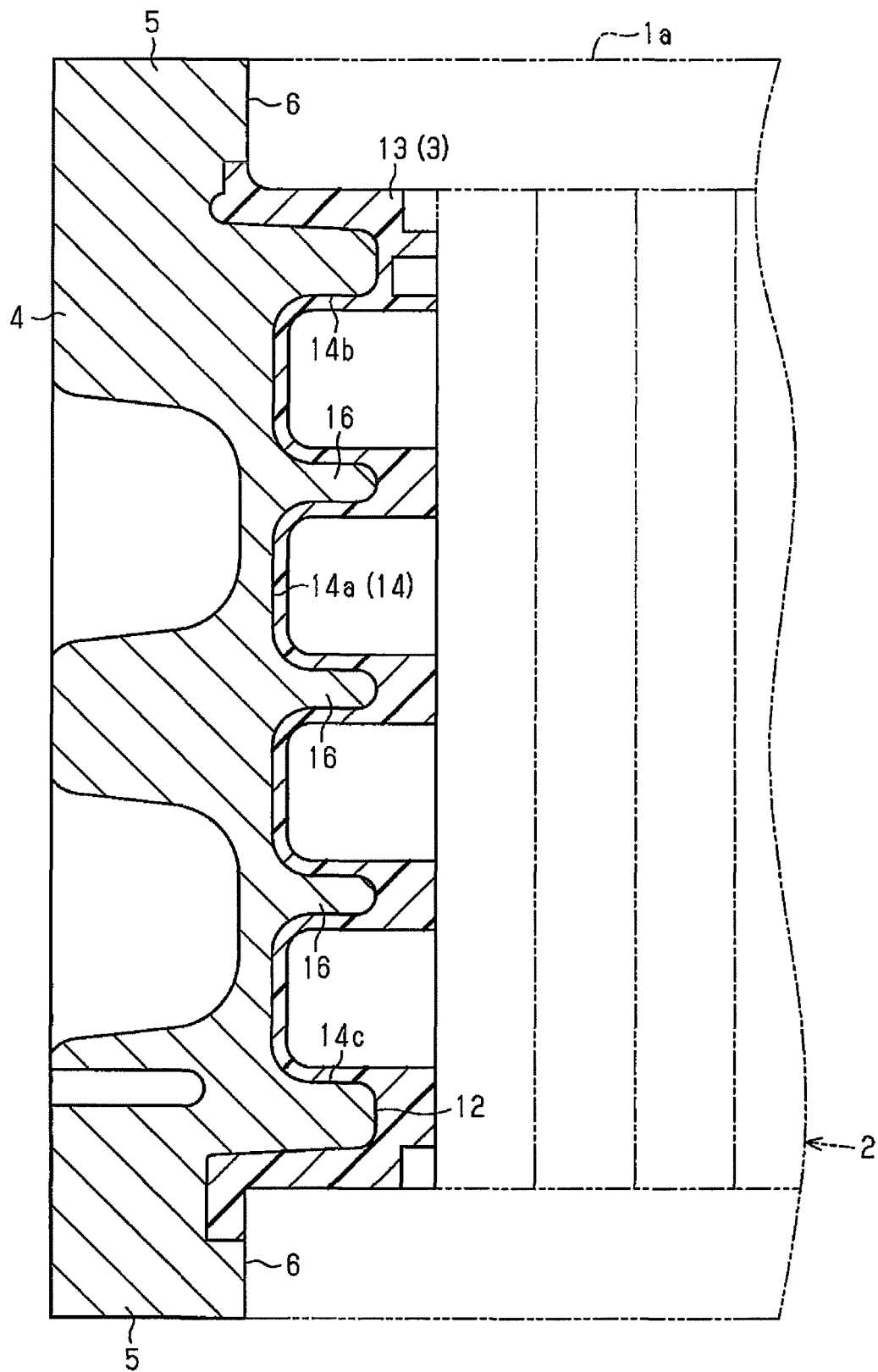
FIG. 3 is a cross-sectional view taken along line A-A of the end plate shown in FIG. 2.

FIG. 3 shows the end plate 4 in FIG. 2 as seen from the direction of arrows A-A. As can be seen from the drawing, the ribs 16 protrude from the bottom surface 14a of the recess 14 to the opening position of the recess 14 in the opposed surface 12. The opposed surface 12, the inner surface of the recess 14, and the outer surfaces of the ribs 16 in the end plate 4 are covered by a plastic layer 13. When the mounting surface 6 of the fastening portion 5 of the end plate 4 is brought into contact with and fixed to the case 1a, the opposed surface 12 and the ribs 16 press the cell stack 2 in the cell stacking direction, so that a favorable cell stacking structure of the cell stack 2 is maintained.

When the fastening portion 5 of the end plate 4 is fixed to the case 1a, the portion of the plastic layer 13 that covers the opposed surface 12 and the portions of the plastic layer 13 that cover the distal end faces in the protruding direction of the ribs 16 contact the end in the cell stacking direction of the cell stack 2. As a result, the end plate 4 and the end in the cell stacking direction of the cell stack 2 are insulated from each other by the portion of the plastic layer 13 that covers the opposed surface 12 and the portions of the plastic layer 13 that cover the distal end faces in the protruding direction of the ribs 16. The plastic layer 13 insulates the fluid in the flow paths formed by the holes 7, 8, 10, and 11 (FIG. 2) from the end plate 4, and insulates the fluid (cooling water) in the flow path formed by the hole 9 and the recess 14 from the end plate 4.

The end plate 4 of the above-described embodiment achieves the following advantages.

(1) In the end plate 4, the recess 14 has a pair of upper and lower inner wall surfaces 14b, 14c. In the portion of the recess 14 that is connected to the passage 15, the vertical distance of the upper and lower inner wall surfaces 14b, 14c increases toward the hole 9. Further, the hole 9 is located at a position higher than the portion of the recess 14 that is connected to the passage 15. Due to this, when the coolant flows into the flow path in the recess 14 from the passage 15 and into the portion in the recess 14 where the upper and lower inner wall surfaces 14b, 14c spread vertically, the coolant does not flow downward smoothly. However, the structure discussed below prevents such a drawback.

That is, in the recess 14, the end close to the passage 15 (the right end in FIG. 2) of the lowermost one of the ribs 16, which are provided at intervals in the vertical direction and formed to extend in the horizontal direction, is closer to the hole 9 (to the left end) than the ends close to the passage 15 of the other ribs 16. As a result, the lowest one of the portions partitioned by the ribs 16 of the flow path in the recess 14 is widened in the portion connected to the passage 15. Therefore, when the cooling water from the passage 15 flows into the portion in the recess 14 where the upper and lower inner wall surfaces 14b, 14c spread vertically, the cooling water flows smoothly downward.

As described above, the cooling water is prevented from flowing less smoothly in the lowest one of the portions partitioned by the ribs 16 of the flow path in the recess 14 than the other portions. This configuration prevents the portion of the end in the cell stacking direction of the cell stack 2 that corresponds to the lowermost portion of the flow path in the recess 14 from being inefficiently cooled, thereby preventing the end from being unevenly cooled.

Second Embodiment

An end plate 4 according to a second embodiment will now be described with reference to FIG. 4.

Figure 4:
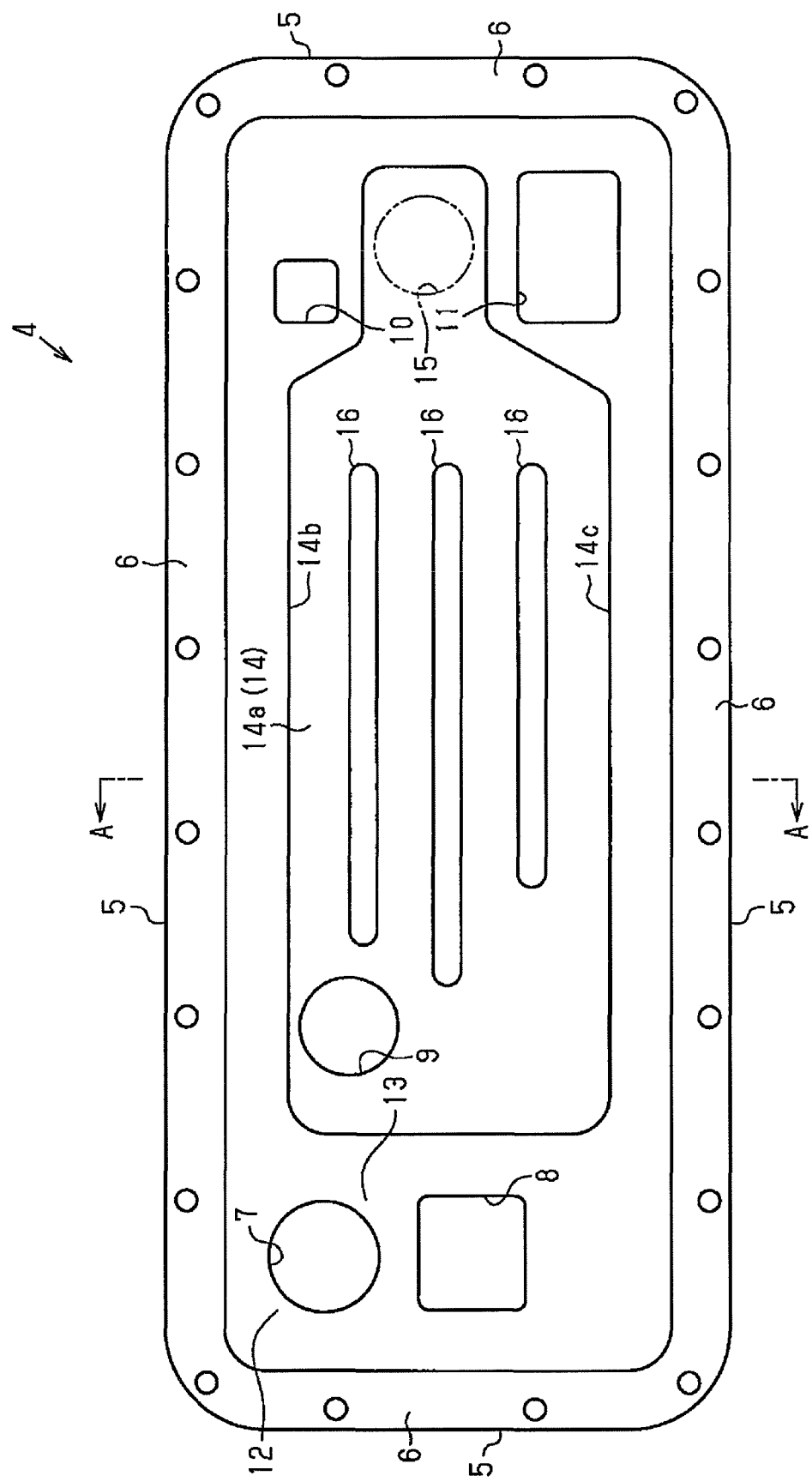
FIG. 4 is a plan view illustrating ribs in an end plate according to a modification.

As shown in FIG. 4, the end plate 4 of this embodiment is different from that of the first embodiment in the configuration of the lowermost rib 16. Specifically, the end close to the hole 9 (the left end) of the lowermost rib 16 is closer to the passage 15 (to the right) than the ends close to the hole 9 of the other ribs 16.

The end plate 4 of the above-described embodiment achieves the following advantage.

(2) In the recess 14, the end close to the hole 9 (the left end) of the lowermost one of the ribs 16 is closer to the passage 15 (to the right) than the ends close to the hole 9 of the other ribs 16. This reduces the flow resistance of the cooling water in the flow direction of the cooling water in the lowermost one of the portions partitioned by the ribs 16 in the flow path of the recess 14. Therefore, when the cooling water from the passage 15 flows into the portion in the recess 14 where the upper and lower inner wall surfaces 14b, 14c spread vertically, the cooling water flows smoothly downward.

As described above, the cooling water is prevented from flowing less smoothly in the lowest one of the portions partitioned by the ribs 16 of the flow path in the recess 14. This configuration prevents the portion of the end in the cell stacking direction of the cell stack 2 that corresponds to the lowermost portion of the flow path in the recess 14 from being inefficiently cooled, thereby preventing the end from being unevenly cooled.

The invention claimed is:

1. An end plate that is shaped as a rectangle having a pair of horizontal long sides and a pair of vertical short sides, wherein the end plate is provided at an end in a cell stacking direction of a cell stack in a fuel cell and is used to supply coolant to and discharge coolant from the cell stack, the end plate comprising:

a recess having a pair of upper and lower inner wall surfaces, the recess being configured to form a flow path in which the coolant flows;
a plurality of ribs formed on a bottom surface of the recess so as to extend in a horizontal direction;
an inlet portion, which allows the coolant to flow into the flow path in the recess from the cell stack; and
an outlet hole, which allows the coolant to flow out from the flow path in the recess, wherein
the recess is open in an opposed surface that faces the end in the cell stacking direction of the cell stack and is formed to extend in the horizontal direction along the opposed surface,
the ribs protrude to an opening position of the recess and are arranged at intervals in a vertical direction,
the inlet portion is provided at an end in the horizontal direction of the recess,
the outlet hole is provided at another end in the horizontal direction of the recess and at a position higher than the inlet portion,
the upper and lower inner wall surfaces in the recess spread vertically toward the outlet hole in a portion of the recess that is connected to the inlet portion, and
an end close to the inlet portion of a lowermost one of the ribs is closer to the outlet hole than ends close to the inlet portion of the other ribs.

2. An end plate that is shaped as a rectangle having a pair of horizontal long sides and a pair of vertical short sides, wherein the end plate is provided at an end in a cell stacking direction of a cell stack in a fuel cell and is used to supply coolant to and discharge coolant from the cell stack, the end plate comprising:

a recess having a pair of upper and lower inner wall surfaces, the recess being configured to form a flow path in which the coolant flows;
a plurality of ribs formed on a bottom surface of the recess so as to extend in a horizontal direction;
an inlet portion, which allows the coolant to flow into the flow path in the recess from the cell stack; and
an outlet hole, which allows the coolant to flow out from the flow path in the recess, wherein
the recess is open in an opposed surface that faces the end in the cell stacking direction of the cell stack and is formed to extend in the horizontal direction along the opposed surface,
the ribs protrude to an opening position of the recess and are arranged at intervals in a vertical direction,
the inlet portion is provided at an end in the horizontal direction of the recess,
the outlet hole is provided at another end in the horizontal direction of the recess and at a position higher than the inlet portion,
the upper and lower inner wall surfaces in the recess spread vertically toward the outlet hole in a portion of the recess that is connected to the inlet portion, and
an end close to the outlet hole of a lowermost one of the ribs is closer to the inlet portion than ends close to the outlet hole of the other ribs.

* * * * *